United States Patent [19]

Müller et al.

[11] 3,950,490

[45] Apr. 13, 1976

[54] PROCESS FOR THE TREATMENT OF CARBURIZING SALT WASTES

[75] Inventors: Wolfgang Müller, Mannheim-Rheinau; Lothar Witzke, Bruhl, both of Germany

[73] Assignee: Th. Goldschmidt AG, Germany

[22] Filed: Dec. 30, 1974

[21] Appl. No.: 537,449

[30] Foreign Application Priority Data

Jan. 4, 1974 Germany............................ 2400319

[52] U.S. Cl. ................. 423/155; 23/303; 423/165; 423/430
[51] Int. Cl.² ......................................... C01F 1/00
[58] Field of Search ........... 423/165, 162, 422, 430, 423/160, 186, 499, 187, 184, 194, 155; 23/303; 75/99

[56] References Cited
UNITED STATES PATENTS

| | | | |
|---|---|---|---|
| 1,346,624 | 7/1920 | Wood .................................. | 23/303 |
| 1,506,946 | 9/1924 | Schilling ............................. | 23/303 |
| 3,627,480 | 12/1971 | Birchall.............................. | 423/430 |
| 3,847,597 | 11/1974 | Mueller et al. ..................... | 423/430 |

FOREIGN PATENTS OR APPLICATIONS

| | | | |
|---|---|---|---|
| 218,460 | 7/1957 | Australia............................ | 423/162 |
| 523,667 | 7/1940 | United Kingdom................. | 423/165 |
| 237,131 | 2/1881 | Japan.................................. | 423/165 |

OTHER PUBLICATIONS

Handbook of Chemistry and Physics, Forty-Third Edition, by The Chemical Rubber Publishing Co., copyright 1961, pp. 540–541.

*Primary Examiner*—Oscar R. Vertiz
*Assistant Examiner*—Wayne A. Langel
*Attorney, Agent, or Firm*—James E. Bryan

[57] ABSTRACT

This invention relates to a process for the treatment of the reaction mass produced during the joint elimination of barium-containing nitrite-/nitrate-bearing carburizing salt wastes and cyanide-/cyanate-bearing wastes by ignition of the dry mixture at elevated temperatures, comprising suspending the reaction mass in water and either (a) adding a water-soluble barium salt to the aqueous suspension in equimolar quantities, based upon carbonate ions, and separating precipitated barium carbonate, or (b) freeing the alkaline suspension from barium carbonate by filtration, reacting the filtrate with a water-soluble calcium salt, and separating precipitated calcium carbonate, concentrating the clear solutions obtained according to (a) or (b) to a water content of 10–20% by weight, separating precipitated sodium chloride, and evaporating the residual solution to dryness.

2 Claims, No Drawings

PROCESS FOR THE TREATMENT OF CARBURIZING SALT WASTES

The present invention relates to a process for the treatment of the reaction mass which is produced during the joint elimination of barium-containing nitrite-/nitrate-bearing carburizing salt wastes and cyanide-/cyanate-bearing wastes by ignition of the dry mixture at elevated temperatures.

Known in the art from German Pat. No. 2,234,171, is a process for the joint elimination and/or treatment of possibly barium-containing carburizing salt wastes based on nitrite-/nitrate-bearing wastes, on the one hand, and cyanide-/cyanate-bearing wastes, on the other hand, by oxidation of the cyanide-/cyanate by nitrite/nitrate. In the process, oxidation of the cyanide-/cyanate-bearing constituent of the carburizing salt wastes with the nitrite-/nitrate-bearing constituent of the carburizing salt wastes takes place at an excess by ignition of the dry mixture at temperatures above 150°C, and the barium carbonate-containing mixture is then leached out with water.

If, according to the process of this patent, an elimination rather than a treatment of the barium salt-containing carburizing salt residues is sought, one adds, prior to the thermal reaction, an amount — corresponding to the barium constituent — of a sulfate of calcium, sodium, or iron. After the thermal reaction, a brittle reaction mass has formed which can be discarded as a non-toxic, neutral salt-containing refuse (main constituent barium sulfate). If, in the process, one works without sulfate addition, the reaction mass contains barium carbonate as the main constituent. When this mixture is leached out with water, the soluble constituents, such as sodium carbonate, potassium chloride and sodium chloride, are dissolved. After filtration of the barium carbonate sludge, the strongly alkaline filtrate obtained is disposed of as waste water, after neutralization with sulfuric acid.

It now has been found in the meantime in actual practice that, depending upon the mode of the process (with or without addition of sulfate), either the waste water — because of the dissolved salts when proceeding without sulfate addition, or the environment — because of the corresponding special refuse load (after addition of sulfate) are affected to a significant degree.

In order to now obtain re-usable salts, after the thermal reaction of the cyanide-/cyanate-bearing mixture with the nitrite-/nitrate-bearing mixture (which was carried out without sulfate addition in order that no insoluble waste products and/or end products be obtained, and in order to considerably reduce the salt content of the waste water), one proceeds in such a manner, according to the present invention, that the reaction mass is suspended in water and either a. water-soluble barium salts are added to the aqueous suspension in equimolar quantities, based upon carbonate ions, and the precipitated barium carbonate is separated in known manner, or b. the alkaline suspension is freed from barium carbonate by filtration, the filtrate is reacted with water-soluble calcium salts, and the calcium carbonate thereby precipitated is separated, whereupon the clear solutions obtained according to (a) or (b) are concentrated to a water content of 10 - 20% by weight, the precipitated sodium chloride is separated, preferably at temperatures in the range of 70°-100°C, and the residual solution is evaporated to dryness.

It has been found to be of particular advantage when barium nitrate is employed as the water-soluble barium salt, and calcium nitrate as the water-soluble calcium salt.

According to the present invention, one proceeds, for example, in such a manner that the still hot reaction mass, which has been obtained from the detoxification reaction, is introduced into cold water while stirring, whereupon a hot suspension having a temperature of approximately 70°C is obtained. Added thereafter to the suspension thereby obtained in case (a) is barium nitrate while stirring is further continued. Due to the reaction of the barium ions with the water-soluble carbonate ions present in the suspension, insoluble barium carbonate is precipitated. The pH value passes from the alkaline range to neutral. When a pH value of 6 is reached, the reaction is terminated. Thereafter, the barium carbonate constituent is separated by filtration washing, together with the matter that was already previously insoluble.

In case of the use of calcium salts as precipitants for the carbonates, the alkaline suspension is first filtered in order that as pure as possible a barium carbonate be obtained, in order to then precipitate calcium carbonate with calcium salt to pH 6, and then separate it.

The clear chloride-containing nitrite-/nitrate filtrate from either (a) or (b) contains 50 to 60% by weight of water and is then concentrated, for purposes of the separation of the chloride constituent, in a crystallization evaporator to a water content of 10 to 20% by weight; the precipitated sodium chloride is separated, preferably at a temperature in the range of 70° to 100°C, and the residual solution is completely freed from water, whereby a directly usable tempering salt is obtained.

An advantage in this case is the prior use of barium nitrate or calcium nitrate as a precipitant since the $NO_3$—$NO_2$- equilibrium of the end product is favorably influenced thereby.

A further advantage resides in the fact that the chloride constituent being separated only as sodium chloride equally favorably influences the sodium-potassium equilibrium in the tempering salt reclaimed product since the entire wastes contain relatively more sodium than is desirable in the low-melting point tempering salt.

When this inventive process was actually carried out, it was found that another process step of the above-mentioned patent also may be deleted, namely the step in which the nitrite-/nitrate-bearing residues are melted down, and a main portion of this nitrite-/nitrate-bearing melt is separated by filtration and must be subjected to a separate treatment. As a result thereof, it was effectively prevented that too much excess nitrite/nitrate was fed to the thermal oxidation reaction which had to be reduced by additions of coke.

This step is now no longer necessary since the excess nitrite/nitrate is obtained in reusable form, according to the new process mode of operation, and in the wet manner at the end of the inventive process, together with the nitrate additionally produced due to the reaction.

It was found to be of particular advantage in connection with the inventive mode of operation that the nitrate content, being mainly consumed by the detoxification reaction, is again formed during the carbonate reaction, and that thus obtained is a tempering salt reclaimed product to which no alkali-nitrates or alkali nitrites need be admixed any longer to make it reusable.

The alkali-nitrites/nitrates obtained can at once again be employed as usable tempering salts in salt hardening rooms.

The inventive process will now be further described with reference to the following examples:

EXAMPLE 1

When 8.0 parts by weight of a hot reaction mass still having a temperature of above 300°C and originating from a completed detoxification reaction between cyanide-/cyanate-bearing and nitrite-/nitrate-bearing carburizing salt wastes are stirred into 10.0 parts by weight of cold water, a hot suspension having a temperature of 70°C is obtained which contains 2.5 parts by weight of barium carbonate and 0.2 part by weight of other undissolved substances, 2.2 parts by weight of sodium chloride, 1.1 parts by weight of alkali carbonate and 2.0 parts by weight of dissolved alkali-nitrite/nitrate. Added to this suspension are 2.5 parts by weight of barium nitrate while stirring is further continued. The end of the reaction is recognizable by a pH value of 6. Thereafter, the barium carbonate constituent is separated by filtration and washing, together with the insoluble matter. Obtained after drying are 4.5 parts by weight of solids with 93% by weight being $BaCO_3$.

The filtrate obtained is concentrated by evaporation together with the wash water under vacuum at temperatures up to 95°C at 190 mm Hg, and the sodium chloride which is precipitated thereby is separated by decanting and centrifuging. There remains a concentrate containing 12% by weight of water from which, after complete water removal, 4.0 parts by weight of tempering salt are obtained with a Cl content of 1.2% by weight. The end product forms a clear melt at 160°C.

EXAMPLE 2

Obtained by filtration and washing from a suspension, as in Example 1, of 8.0 parts by weight of hot reaction mass from the detoxification reaction with 10.0 parts by weight of cold water are 2.7 parts by weight of crude barium carbonate containing 93% by weight of $BaCO_3$.

Added to the filtrate at 50°C while stirring are 1.55 parts by weight of calcium nitrate, whereupon a pH value of 6 is attained. 0.95 part by weight of calcium carbonate may be obtained therefrom by decanting, filtering and washing. The clear filtrate is concentrated as in Example 1, the undissolved common salt is separated, and the residue is freed from water. Obtained are 4.0 parts by weight of tempering salt containing 1.2% by weight of Cl. The end product forms a clear melt at 160°C.

It will be obvious to those skilled in the art that many modifications may be made within the scope of the present invention without departing from the spirit thereof, and the invention includes all such modifications.

What is claimed is:

1. A process for the treatment of the reaction mass produced by igniting a dry mixture of barium-containing nitrite-/nitrate-bearing carburizing salt wastes and cyanide-/cyanate-bearing wastes at temperatures above about 150°C, comprising suspending the reaction mass in water to obtain a suspension containing sodium chloride, alkali carbonate, and alkali-nitrite/nitrate as dissolved constituents, and barium carbonate as an undissolved constituent,
    adding barium nitrate to the aqueous suspension in equimolar quantities, based upon carbonate ions,
    separating barium carbonate,
    concentrating the clear solution obtained to a water content of 10–20% by weight to precipitate sodium chloride,
    separating the sodium chloride,
    and evaporating the residual solution to dryness.

2. A process according to claim 1 in which the precipitated sodium chloride is separated at a temperature in the range of about 70°–100°C.

* * * * *